United States Patent Office 3,515,455
Patented June 2, 1970

3,515,455
DIGITAL LIGHT DEFLECTING SYSTEMS
Rudolf Kompfner, Middletown, N.J., assignor to Bell Telephone Laboratories, Incorporated, Murray Hill, N.J., a corporation of New York
Filed Aug. 4, 1967, Ser. No. 658,418
Int. Cl. G02f 3/00
U.S. Cl. 350—150          4 Claims

ABSTRACT OF THE DISCLOSURE

Radiation deflecting systems utilize arrangements of isotropic elements, such as mirrors and lenses, to achieve efficient digital deflection of electromagnetic radiation. In particular, these arrangements are placed between adjacent electrooptic deflectors and are contrived to alter the beam displacement and to redirect and focus the displaced beam on the next succeeding deflector. Since the beam redirectors alter the displacement of the beam, less power is consumed in the electrooptic deflectors, and since the beam is redirected and focused upon each deflector, deflectors having smaller cross sections can be used. Embodiments using a combination of lenses and parallel pairs of mirrors are described in detail.

---

This invention relates to beam deflecting systems utilizing isotropic beam redirectors to achieve efficient digital deflection of electromagnetic radiation.

Background of the invention

Because of their high speeds of operation, electrooptic digital light deflecting systems have been the subject of considerable research effort. Unlike mechanical systems, electrooptic beam deflectors operate without the necessity of overcoming significant mechanical inertia. Consequently, very high deflecting speeds are possible, and new applications such as optical memories, high speed optical switches, special display devices and nonimpact printers are now being considered.

A typical digital deflecting system comprises a plurality of cascaded electrooptic deflecting stages. Each of the deflecting stages typically comprises an electrooptic polarization switch and a birefringent element such as, for example, a uniaxial crystal or a Wollaston prism. In operation, a signal voltage across the electrooptic switch is used to switch a linearly polarized beam between two orthogonal polarization states. The birefringent element then deflects the beam in one of two directions depending upon the polarization. Thus, for example, a beam can be deflected to either an upper or a lower position depending upon the signal voltage. When an integral number, $n$, of these binary deflectors are cascaded, an input beam can be deflected to any one of $2^n$ different output positions.

However, a number of practical considerations limit the operation of such a deflecting system. One such limitation, for example, arises from the difficulty of producing large electrooptic and birefringent elements having sufficient optical uniformity. Typically, only very small electrooptic crystals, having volumes on the order of a cubic millimeter, can be produced at reasonable cost with adequate optical uniformity for these purposes. Additionally, in the case of the birefringent elements, an increasing amount of aberration due to nonuniformity occurs as it becomes necessary to increase the optical pathlength within the element. Analog type deflectors suffer from an inefficiency in producing large deflections. As the amount of deflection increases beyond a single beamwidth, the amount of power required becomes disproportionately larger. Yet another limitation, interrelated with those previously mentioned, arises from the fact that as the number of stages is increased, it is correspondingly necessary to provide deflectors which have progressively larger cross sections. This requirement is due in part to the increase in the amount of total maximum displacement in the latter stages and in part to the diffraction spreading of the beam. However, deflectors having larger cross sections require increasingly greater power. Moreover, as previously mentioned, the requirement of optical uniformity limits the size of the deflector cross sections. Hence, both the efficiency and the number of attainable addresses are thus limited.

Summary of the invention

In a deflecting system in accordance with the invention, the effects of the aforementioned limitations are reduced by the use of an arrangement, hereinafter referred to as an isotropic beam redirector, comprising isotropic elements, such as mirrors and lenses, contrived first to alter the amount by which a deflected beam is displaced and then to redirect the beam across the optical axis of the deflecting system. In such a system each deflector is used to deflect the beam only a small amount, for example, a single beam width regardless of the position of the deflector in the system. The isotropic beam redirectors, located between succeeding deflectors, are used to alter the amount of displacement and to redirect the beam. In addition, the beam is advantageously focused upon the next succeeding deflector. Since each of the deflectors produces only a small displacement, the total power consumed by this system is considerably less than that consumed by a prior art system consisting of deflectors alone. Moreover, the redirecting and refocusing of the deflected beam permits the use of deflectors having smaller transverse cross sections. The use of smaller deflectors additionally reduces the power consumed and permits the use of more nearly perfect electrooptic and birefringent crystals.

Brief description of the drawings

The above-mentioned and other objects and advantages of the invention will be more readily understood from the following discussion, taken in conjunction with the accompanying drawings in which.

Detailed description

Figure 1:
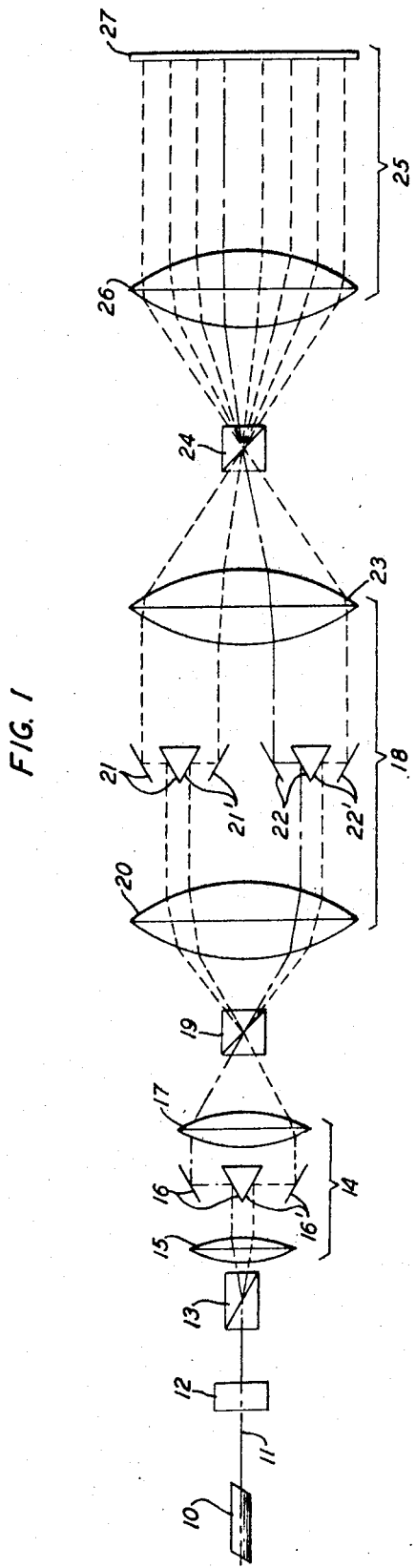
FIG. 1 is a schematic cross section of an illustrative embodiment of a one-dimensional digital deflecting system in accordance with the invention.

FIG. 1 is a schematic cross section of a one-dimensional deflecting system in accordance with the invention. In this figure there is shown a source 10 of electromagnetic radiation, advantageously an optical maser, adapted to direct a beam 11 of radiation through a plane polarizer 12 onto a first electrooptic deflector 13. Typically, a deflector comprises an electrooptic polarization switch and a Wollaston prism, or an electrooptic prism pair. For examples of electrooptical deflectors, see Kaminow and Turner, Electrooptic Light Modulators, Applied Optics, vol. 5, No. 2, p. 1612, October 1966. Electrical means, not shown, are provided for applying an appropriate signal voltage across deflector 13 and each of the succeeding deflectors 19 and 24. Isotropic beam redirectors 14 and 18 are located between the successive deflectors. In the particular embodiment of FIG. 1 there is shown one illustrative example of the many possible redirector arrangements. The first redirector 14 includes a first lens 15 provided to redirect a deflected beam in a direction parallel to the optical axis. Following lens 15 there are two pairs of parallel reflecting surfaces 16 and 16' oriented to further displace the beam while maintaining it parallel to the optical axis of the system. A second lens 17 is provided to focus and to redirect the beam upon the next succeeding deflector 19 which is centered along the optical axis. Each succeeding stage is substantially the same except that in order to accommodate the increasing number of possible beam positions, the number of parallel pairs of reflecting surfaces is doubled. Thus, the redirector 18 which follows the second deflector 19 has 4 parallel pairs of reflecting surfaces 21, 21', 22 and 22'. In general, the redirector following the $n^{th}$ deflector has $2^n$ parallel pairs. Advantageously, the separation between the two reflecting surfaces in each parallel pair is halved at each succeeding stage.

A receiver 25, having address points which are responsive to radiation from source 10 is placed after the last deflector 24. Such a receiver can, for example, comprise a collimating lens 26 and a photographic plate 27.

In operation, a beam 11 of radiation from source 10 enters the plane polarizer 12 and is linearly polarized. The polarized beam then enters the first deflector 13 and is deflected to either an upper or a lower position depending upon the signal voltage applied to deflector 13. The deflected beam is realigned parallel to the optical axis by leans 15, is further deflected by mirror arrangement 16 and then redirected and simultaneously focused upon the next succeeding deflector 19 by lens 17. (In the figure, beam 11, represented by the broken line, is shown deflected upward. Other possible paths over which a beam can be deflected are illustrated by the dotted lines.) Substantially the same steps are repeated at each succeeding stage. Beam 11 is shown further deflected into the upper beam position by deflector 19 and into the lower position by deflector 24. After passing through deflector 24 the beam is focused by lens 26 onto the photographic plate 27.

For convenienec in illustration, FIG. 1 shows the various system elements much closer together in the longitudinal direction than would be the case in actual practice. Advantageously, the stages are sufficiently spaced apart so that the largest angle the beam makes with the optical axis as it passes through any one of the deflectors is small, typically less than 5°.

As previously stated, there are many possible isotropic beam redirecting arrangements. For example, as is well known in the art, curved reflecting surfaces can be used to redirect and focus a beam. Thus, if reflecting surfaces 16 and 21 are appropriately curved and directed, lenses 17 and 23 can be eliminated. This is only one of the many possible arrangements which can be employed in the isotropic beam redirector portion of the system. For purposes of the invention, the important features of these arrangements are that they are comprised of isotropic elements, that they produce a change in the beam deflection, and that they redirect the beam across the system's optical axis, preferably also focusing the beam at the axis.

Figure 2:
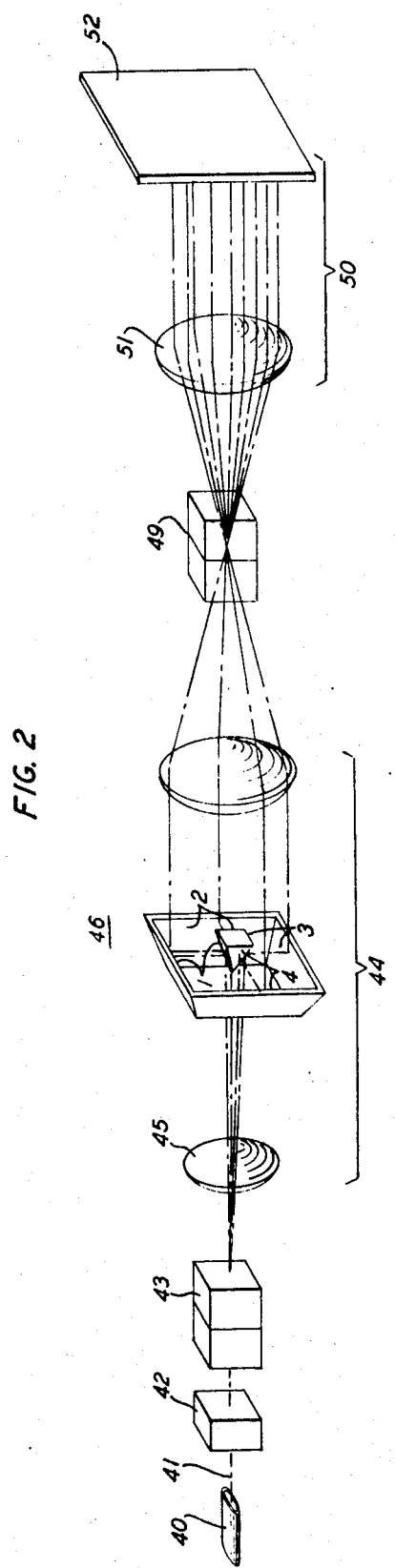
FIG. 2 is a schematic drawing of a two-dimensional deflecting system in accordance with the invention.

FIG. 2 is a schematic drawing of a two-dimensional system in accordance with the invention. The system is substantially the same as that shown in FIG. 1, with appropriate modifications to produce two-dimensional deflection. In this second embodiment, each of the two deflectors 43 and 49 shown comprises a pair of digital deflectors oriented relative to each other to produce mutually perpendicular beam deflections. The isotropic beam director 44 includes a displacing element 46 comprisng four pairs of parallel reflecting surfaces 1, 2, 3 and 4 to further displace the deflected beam in each of the four possible directions in which it can be deflected.

The operation of the system is substantially the same as that of the system shown in FIG. 1. A beam 41 is directed by source 40 through plane polarizer 42 onto the two-dimensional deflector 43. The beam is then deflected in one of four directions depending upon the signal voltages applied to the deflector 43. The isotropic beam redirector 44 increases the amount by which the beam is displaced and at the same time redirects and focuses it upon the next deflector 49. The beam is then further deflected by deflector 49 in one of the four possible directions, following which it is directed upon plate 52 by a focusing lens 51. While a system using only two deflectors is shown, systems employing a larger number can readily be constructed in accordance with the principles of the invention by placing isotropic beam deflectors between succeeding deflectors. In the two-dimensional case, the number of displacing elements quadruples for each succeeding stage. Thus, following the $n^{th}$ pair of deflectors there are $4^{n-1}$ displacing elements, each containing 4 parallel pairs of reflecting surfaces. Advantageously, the separation between parallel mirrors is halved at each succeeding stage.

In all cases it is understood that the above-described arrangements are illustrative of but a small number of the many possible specific embodiments which can represent applications of the principles of the present invention. Numerous and varied other arrangements can be readily devised in accordance with these principles by those skilled in the art without departing from the spirit and scope of the invention.

What is claimed is:
1. A radiation deflecting system comprising:
   a plurality of successive digital radiation deflectors on an optical axis;
   a source of electromagnetic radiation adapted to direct a polarized beam of said radiation upon the first of said deflectors;
   a plurality of isotropic beam redirectors each of which is disposed between successive deflectors and is adapted to alter the displacement from the optical axis of a beam deflected from the preceding deflector and to redirect it upon the next succeeding deflector and across the optical axis; and
   means responsive to radiation from said source placed to receive the beam from the last of said succeeding deflectors.

2. A deflecting system according to claim 1 wherein each of said isotropic beam redirectors comprises a collimating lens, pairs of reflective surfaces adapted to transversely displace a beam deflected by the preceding deflector, and a lens adapted to redirect and focus the displaced beam onto the next succeeding deflector.

3. A deflecting system in accordance with claim 1 wherein:
   said plurality of successive digital radiation deflectors comprises a series of electrooptic digital deflectors;
   said source of radiation comprises an optical maser; and
   the isotropic beam redirector disposed between the $n^{th}$ and $(n+1)^{th}$ deflector of said series comprises a lens adapted to realign a beam deflected by the $n^{th}$ deflector in a direction parallel with the optical axis, $2^n$ parallel pairs of reflecting surfaces adapted to transversely displace a realigned deflected beam, and a lens adapted to redirect and focus the displaced beam onto the $(n+1)^{th}$ deflector.

4. A deflecting system in accordance with claim 1:
   wherein said plurality of successive digital radiation deflectors are each adapted to produce beam displacement in two mutually perpendicular directions;
   wherein said source of radiation comprises an optical maser; and
   wherein the isotropic beam redirector disposed between the $n^{th}$ and the $(n+1)^{th}$ pairs of deflectors of said series comprises a lens adapted to realign a beam deflected by the $n^{th}$ pair of deflectors in a direction parallel with the optical axis, $4^{n-1}$ displacing elements each comprising four parallel pairs of reflecting surfaces adapted to transversely displace a realigned deflected beam, and a lens adapted to direct and to focus the displaced beam upon the $(n+1)^{th}$ pair of deflectors.

References Cited

UNITED STATES PATENTS 3,410,624  11/1968  Schmidt _____ 350—150
3,430,048  2/1969   Rubinstein _____ 350—150
3,438,692  4/1969   Tabor _____ 350—150

DAVID SCHONBERG, Primary Examiner

P. R. MILLER, Assistant Examiner

U.S. Cl. X.R.

350—147, 157